United States Patent
Binkley et al.

[15] 3,646,968
[45] Mar. 7, 1972

[54] POWER TRANSMISSION VALVE WITH DETENT

[72] Inventors: Carl R. Binkley, Warren; Robert G. Farrell, Royal Oak, both of Mich.

[73] Assignee: Sperry Rand Corporation, Troy, Mich.

[22] Filed: Sept. 30, 1970

[21] Appl. No.: 76,890

[52] U.S. Cl.....................................137/625.64, 251/73
[51] Int. Cl.................................F16k 11/07, F16k 31/44
[58] Field of Search..................137/625.6, 625.64, 624.27; 251/68, 73, 94, 297

[56] References Cited

UNITED STATES PATENTS 2,844,166  7/1958  Edman..............................251/73 X
3,528,638  9/1970  Finley et al.........................251/73

*Primary Examiner*—Henry T. Klinksiek
*Attorney*—Van Meter and George

[57] ABSTRACT

A remotely controlled directional valve of the sliding spool type for hydraulic power systems has a differential area actuating piston and a three-way followup pilot valve concentric with the spool. The pilot valve is actuated by a lever and a rotary shaft extending through the wall of the chamber enclosing the large side of the differential piston. A cap member provides detent means for the pilot valve together with interchangeable two-way valves actuated electrically or pneumatically for admitting pilot pressure to release the detents.

7 Claims, 5 Drawing Figures

PATENTED MAR 7 1972 3,646,968

INVENTORS
Carl R. Binkley, &
BY Robert G. Farrell

ATTORNEY

POWER TRANSMISSION VALVE WITH DETENT

With the construction of larger and larger mobile material handling machinery, the hydraulic power systems which they employ require larger and larger directional valves for controlling the flow of pressure fluid to the hydraulic actuators which operate their buckets, blades and similar material handling members. With the larger size valves, it becomes uneconomical to position the valves adjacent the operator and lead the numerous large size conduits to and from that position. It is more economical to locate the valves for convenience of plumbing and to provide mechanical actuating means between the operator's station and the valve. These mechanical actuators, however, require rather heavy construction and oftentimes must be lead through devious paths through the machine, resulting in lost motion and the lack of precision in correspondence between the position of the operator's handle and the position of the valve spool ultimately operated. In addition, the manual effort required to shift large size hydraulic valves becomes somewhat high, further increasing the difficulty of achieving reliable control of a large valve from a distant operator's position.

It is an object of the present invention to provide a remotely controlled directional valve which will overcome these difficulties enabling precision control to be achieved without requiring the transmission of large forces from a remotely located operating position. A further object is to provide a valve of this character wherein pilot fluid pressure may be utilized for giving power assistance to shift the valve to any desired position under operator control exercised through mechanical connections which transmit only small force applications.

These objects are achieved by the invention which consists in a remotely controlled directional valve comprising a main body, a main spool slidable in the body, porting in the body and grooving on the spool to direct fluid flow forwardly and reversely and to terminate flow to and from a work device, a centering spring for the main spool, means forming an actuating piston coaxial with the main spool and having large and small affective areas on its opposing faces, means forming a path for the admission of pressure fluid to the small side of the actuating piston, a followup pilot valve for admitting or releasing pressure fluid at the large side of the actuating piston, a centering spring for the pilot valve and a rotary actuating device for the pilot valve projecting outside the pilot valve through a rotary shaft seal. In the drawings:

Figure 1:
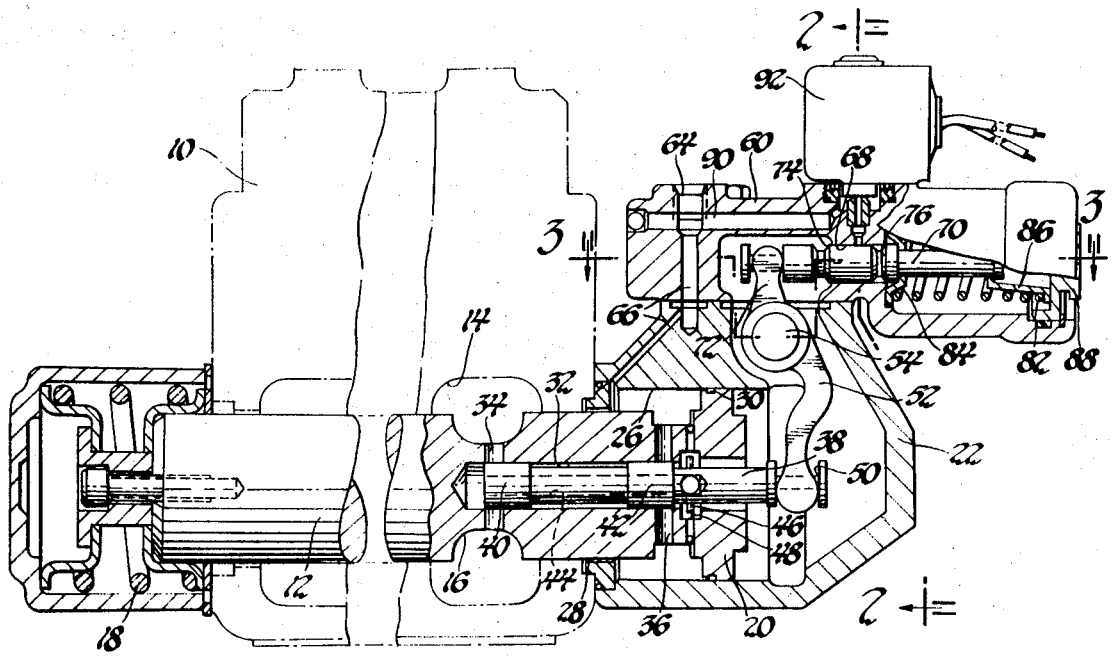
FIG. 1 is a longitudinal sectional view of a valve incorporating a preferred form of the present invention.
Figure 2:
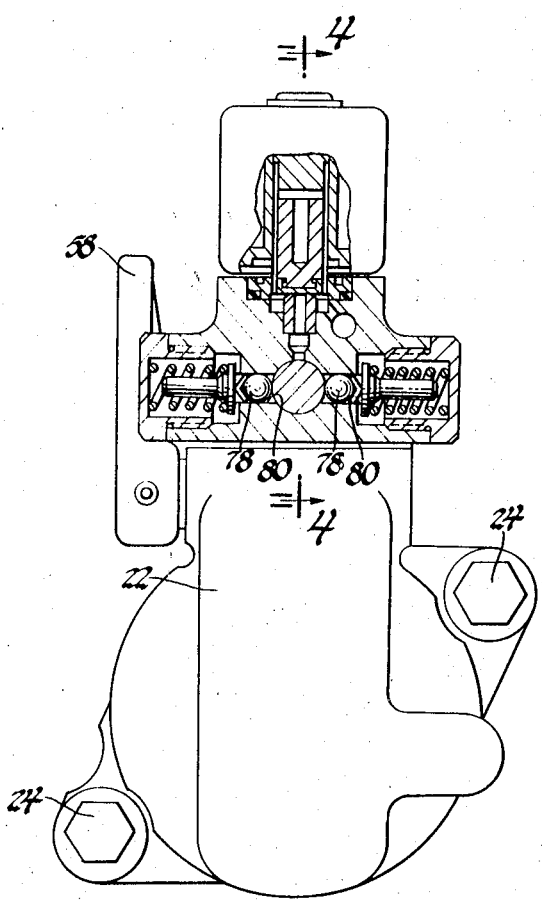
FIG. 2 is a view, partly in section, taken on line 2—2 of FIG. 1.

As illustrated in FIG. 1, the main valve comprises a body 10 and a sliding spool 12 which may be of any conventional form for controlling hydraulic power between a pressure supply and a work device. Such valves have a plurality of ports such as 14 in the body and grooves such as 16 in the spool, the groove 14 in this instance being one which communicates with the tank return passages in the hydraulic power system. A centering spring assembly 18 of conventional form holds the valve in its center or neutral position in which flow to and from the work device is interrupted. When the spool 12 is shifted to one side or the other of center position against the bias of the spring 18, flow to and from the work device will be initiated in either forward or reverse sense respectively. This is illustrative of the many well-known types of hydraulic directional control valves.

The spool 12 of the present invention is provided with a differential actuating piston 20, the left side of which has an effective area substantially half that of the right side. A pilot housing 22 is attached to the right end of the body 10 by bolts 24 and has a cylindrical bore 26 within which the piston 20 reciprocates. Sliding seals at 28 and 30 are provided for the spool 12 and the piston 20 respectively. The main spool 12 has a pilot valve bore 32 which communicates near its left end through radial bores 34 with the tank return port 14 of the main body 10. Near its right-hand end, the bore 32 communicates by passages 36 with the space at the small area side of the piston 20 which is constantly exposed to pilot fluid pressure, as will later be described. Slidable in the bore 32 is a pilot valve spool 38 having lands 40 and 42 which, in the neutral position illustrated, just close off the radial passages 34 and 36. The spool 38 has an internal passage 44 which connects its left end face with the space at the right of the differential piston 20. A pin 46 is pressed in the spool 38 and cooperates with a groove 48 in the main spool 12 to limit the motion of the pilot valve relative to the main spool. The lands 42 and 40 control the admission and exhaust of pilot pressure fluid to and from the large side of piston 20 causing the spool 12 to follow up the displacements of the stem 38.

Figure 3:
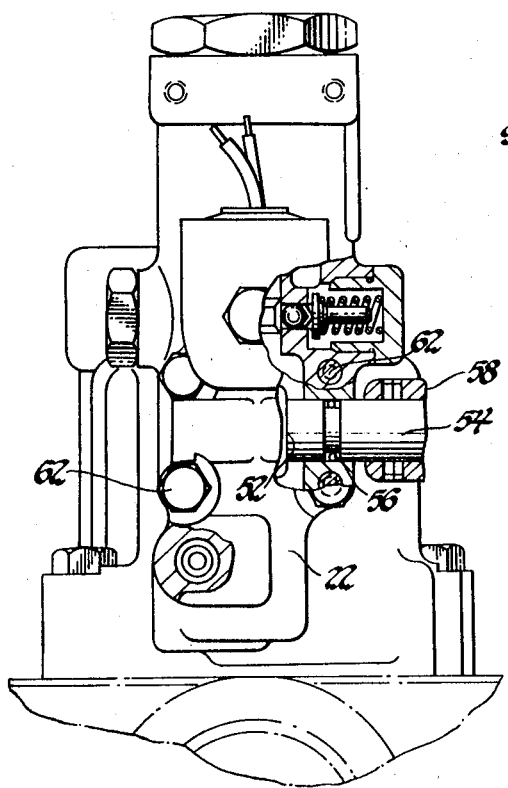
FIG. 3 is a view, partly in section, taken on line 3—3 of FIG. 1.

The pilot valve spool 38 has a groove 50 which receives a rotary actuator comprising a lever 52 secured to a rotary shaft 54. As illustrated in FIG. 3, the shaft 54 projects through the wall of the pilot body 22 and has a rotary seal 56. An external operating lever 58 is pinned to the shaft 54 and when connected to a suitable light duty operating mechanism, such as a flexible shaft or a series of links and levers, can be shifted to any desired position from a remote operating location and only a small mechanical effort is required thereby to move the pilot valve spool 38 to whatever the position the operator desires.

The top of the pilot body 22 is closed by a cap member 60 secured thereto by bolts 62. The cap 60 has a fluid terminal 64 for connection to a suitable source of pilot pressure fluid. Passages 66 in the cap 60 and pilot body 22 supply such pressure fluid to the bore 26 at the left side of the differential piston 20 and also through radial passages 36 to the pilot valve itself. The cap 60 has a bore 68 in which is freely slidable a stem 70 which is shiftable with the rotary actuator 54 by means of a lever 72. The stem 70 serves as part of a detent mechanism and also for the purpose of acting as a centering mechanism for the pilot spool 38, including, of course, the mechanical actuating connections therefore which may be connected with the lever 58.

For these purposes, the stem 70 is provided with one or more grooves, such as 74 and 76, which cooperate with spring pressed detent balls 78 slidable in radial holes 80. Thus, in either extreme position of the stem 70, the balls 78 will enter the appropriate one of the grooves 74 or 76 and detain the pilot valve system in that position.

The stem 70 and the pilot valve system are biased to central position by a centering spring mechanism consisting of the spring 82 and the retainers 84 and 86. This centering spring mechanism is retained in the cap member 60 by a closure 88 which permits substitution of centering springs of varying strength as may be required by the particular mechanical motion transmitting arrangements between the valve and the operator's station.

Figure 4:
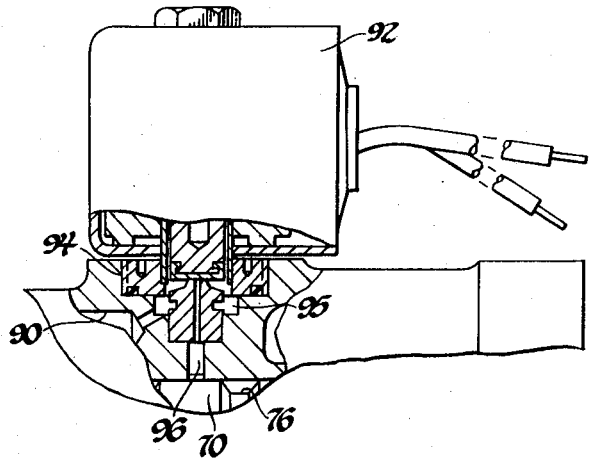
FIG. 4 is a view, partly in section, taken on line 4—4 of FIG. 2.

For the purpose of releasing the detent balls 78, there is provided a passage 90 from the pilot pressure supply connection 64 to a release valve assembly 92 which, in the form illustrated on a larger scale in FIG. 4, is a solenoid-operated two-way valve screwed into a bore 94. When the valve is opened, it admits pilot pressure from the counterbore 95 to a passage 96 which leads to the inner face of the detent balls 78. Normally, that is when valve 92 is closed, the pressure adjacent the detent balls and their springs is that existing within the pilot housing 22 on the large area side of the differential piston 20 (approximately one half the pilot pressure), since the clearance between stem 70 and bore 68 is such as to permit these pressures to equalize over a short period of time. When valve 92 is opened, however, the higher pilot pressure is admitted to the inner faces of the balls 78 and propels them outwardly against their springs to release the stem 70 which moves to center position under the action of the centering spring 82.

Figure 5:
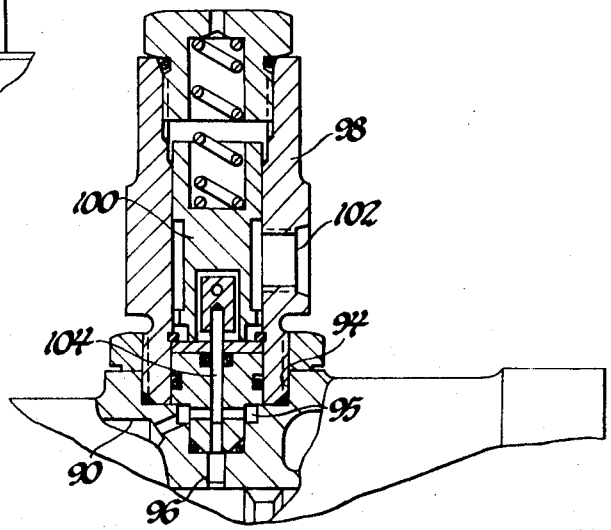
FIG. 5 is a view corresponding to FIG. 4 illustrating a modified form of the present invention.

Although an electrically operated detent release mechanism is illustrated in the device thus far described, it will be understood that other types of detent release mechanisms may be screwed into the bore 94 should it be desired to release the detents through other means than an electrical control. Thus, for example as illustrated in FIG. 5, a pneumatically operated two-way valve 98 may be inserted in the bore 94. The valve 98 has a spring biased piston 100 which, when supplied with air pressure through the connection 102, lifts the valve stem 104 to admit hydraulic pressure from the counterbore 95 to the passage 96 and the detent balls 78. Alternatively, a hydraulic terminal connection may be screwed into the bore 94 for the admission of hydraulic pressure from another pilot source directly to the passage 96 for the purpose of releasing the detents.

We claim

1. A remotely controlled directional valve comprising a main body, a main spool slidable in the body, porting in the body and grooving on the spool to direct fluid flow forwardly and reversely and to terminate flow to and from a work device, a centering spring for the main spool, means forming an actuating piston coaxial with the main spool and having large and small effective areas on its opposing faces, means forming a path for the admission of pressure fluid to the small side of the actuating piston, a followup pilot valve for admitting or releasing pressure fluid to the large side of the actuating piston, a centering spring for the pilot valve and a rotary actuating device for the pilot valve projecting outside the pilot valve through a rotary shaft seal.

2. A valve as defined in claim 1 wherein the pilot valve has a replaceable cap member containing the centering spring.

3. A valve as defined in claim 2 wherein the cap member contains a detent mechanism for holding the pilot valve in a predetermined position.

4. A valve as defined in claim 3 wherein the cap includes a third valve for admitting pressure fluid to the detent mechanism for releasing the pilot valve detent mechanism.

5. A valve as defined in claim 1 wherein the rotary actuating device is positioned at the large side of the actuating piston and is exposed to the pressure fluid on that side of the piston.

6. A valve as defined in claim 4 wherein the third valve is a two-way valve and a leakage path is provided from the detent mechanism to the large side of the actuating piston.

7. A valve as defined in claim 1 wherein the pilot valve is positioned inside the main spool and exhausts pressure fluid from the large side of the actuating piston to a tank return port in the main valve.

* * * * *